US012650521B2

(12) United States Patent
Jeng

(10) Patent No.: US 12,650,521 B2
(45) Date of Patent: Jun. 9, 2026

(54) COMPOSITE PRN CODE TO ACHIEVE HIGHER EFFECTIVE CHIP RATE FOR LOWER TIME-OF-ARRIVAL ERROR

(71) Applicant: The Boeing Company, Arlington, VA (US)

(72) Inventor: Isaac M. Jeng, Yorba Linda, CA (US)

(73) Assignee: The Boeing Company, Arlington, VA (US)

( * ) Notice: Subject to any disclaimer, the term of this patent is extended or adjusted under 35 U.S.C. 154(b) by 64 days.

(21) Appl. No.: 18/798,372

(22) Filed: Aug. 8, 2024

(65) Prior Publication Data

US 2026/0043926 A1 Feb. 12, 2026

(51) Int. Cl.
*G01S 19/30* (2010.01)
*G01S 19/37* (2010.01)

(52) U.S. Cl.
CPC .............. *G01S 19/30* (2013.01); *G01S 19/37* (2013.01)

(58) Field of Classification Search
CPC ...................................................... G01S 19/30
USPC ........................................................ 375/150
See application file for complete search history.

(56) References Cited

U.S. PATENT DOCUMENTS

| | | | |
|---|---|---|---|
| 4,278,977 A | 7/1981 | Nossen | |
| 6,236,673 B1 | 5/2001 | Julg | |
| 6,650,282 B2 | 11/2003 | Martikka | |
| 6,985,743 B2 | 1/2006 | Bajikar | |
| 7,205,935 B2 | 4/2007 | Sleewaegen | |
| 8,330,648 B2 | 12/2012 | Park et al. | |
| 8,467,347 B2 | 6/2013 | Gao et al. | |
| 8,675,561 B2 | 3/2014 | Sun et al. | |
| 8,879,407 B2 | 11/2014 | Ekbal et al. | |
| 8,886,125 B2 | 11/2014 | Agrawal et al. | |
| 9,215,581 B2 | 12/2015 | Julian et al. | |
| 2004/0198387 A1 | 10/2004 | Tsuji et al. | |
| 2007/0285306 A1 | 12/2007 | Julian et al. | |
| 2008/0186948 A1* | 8/2008 | Ramaswamy | ...... H04L 27/2675 370/350 |
| 2011/0241924 A1* | 10/2011 | Yamamoto | ............. G01B 15/08 342/118 |
| 2017/0115373 A1 | 4/2017 | Lindstrom et al. | |
| 2017/0168154 A1 | 6/2017 | Wallin | |
| 2019/0277976 A1* | 9/2019 | Naveen | ................... G01S 19/24 |

* cited by examiner

*Primary Examiner* — Lihong Yu
(74) *Attorney, Agent, or Firm* — Yee & Associates, P.C.

(57) ABSTRACT

Generating a composite pseudo random noise (PRN) code is provided. The method comprises receiving a wireless transmission having a noisy received original PRN code multiplexed with navigation data. A noiseless local replica original PRN code is generated within the receiver. A noiseless local replica compressed PRN code is then generated based on the noiseless local replica original PRN code. The noiseless local replica compressed PRN code has the same length as the noiseless local replica original PRN code and a higher chip rate. A sample-to-sample multiplication operation on the noisy received original PRN code and the noiseless local replica compressed PRN code generates a noisy received composite PRN code. The received wireless transmission is then tracked according to the noisy received composite PRN code.

20 Claims, 15 Drawing Sheets

FIG. 5

| ORIGINAL C/A$_1$ | COMPRESSED C/A$_1$ | OUTPUT OF $\oplus$ |
|---|---|---|
| -1 | -1 | 1 |
| -1 | 1 | -1 |
| 1 | -1 | -1 |
| 1 | 1 | 1 |

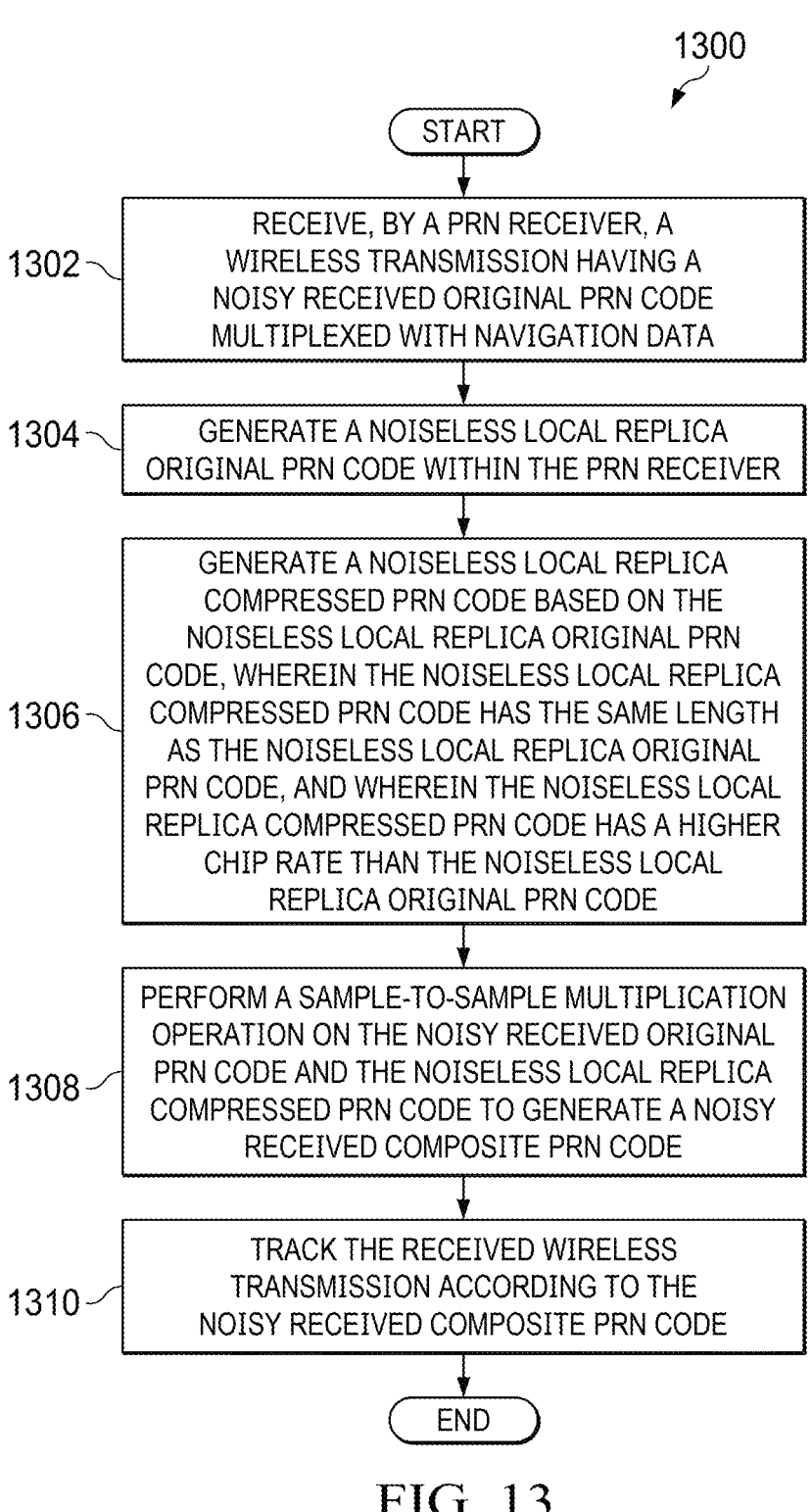

1300

START

1302 — RECEIVE, BY A PRN RECEIVER, A WIRELESS TRANSMISSION HAVING A NOISY RECEIVED ORIGINAL PRN CODE MULTIPLEXED WITH NAVIGATION DATA

1304 — GENERATE A NOISELESS LOCAL REPLICA ORIGINAL PRN CODE WITHIN THE PRN RECEIVER

1306 — GENERATE A NOISELESS LOCAL REPLICA COMPRESSED PRN CODE BASED ON THE NOISELESS LOCAL REPLICA ORIGINAL PRN CODE, WHEREIN THE NOISELESS LOCAL REPLICA COMPRESSED PRN CODE HAS THE SAME LENGTH AS THE NOISELESS LOCAL REPLICA ORIGINAL PRN CODE, AND WHEREIN THE NOISELESS LOCAL REPLICA COMPRESSED PRN CODE HAS A HIGHER CHIP RATE THAN THE NOISELESS LOCAL REPLICA ORIGINAL PRN CODE

1308 — PERFORM A SAMPLE-TO-SAMPLE MULTIPLICATION OPERATION ON THE NOISY RECEIVED ORIGINAL PRN CODE AND THE NOISELESS LOCAL REPLICA COMPRESSED PRN CODE TO GENERATE A NOISY RECEIVED COMPOSITE PRN CODE

1310 — TRACK THE RECEIVED WIRELESS TRANSMISSION ACCORDING TO THE NOISY RECEIVED COMPOSITE PRN CODE

END

COMPOSITE PRN CODE TO ACHIEVE HIGHER EFFECTIVE CHIP RATE FOR LOWER TIME-OF-ARRIVAL ERROR

BACKGROUND INFORMATION

Technical Field

The present disclosure relates generally to wireless communication or navigation, and more specifically to improving ranging accuracy with a composite PRN code.

Background

Pseudorandom Noise (PRN) codes are often employed as ranging codes in systems where it is desirable to determine the range or distance a PRN receiver is from a PRN transmitter. Typically, the range or distance between the PRN transmitter and PRN receiver is determined based on the data carried by the PRN codes. While PRN codes themselves do not have information for range determination, PRN codes are the means for the PRN receiver to determine the ranging accuracy.

Typically, systems that employ PRN codes as ranging codes do so by receiving the ranging code with a PRN receiver and correlating the received PRN code to the receiver with a local replica PRN within the receiver. Such systems include, for example, Code Division Multiple Access (CDMA) based navigation systems such as, for example, global positioning systems (GPS), other Global Navigation Satellite Systems (GNSS), positioning systems (such as the Russian GLONASS system), or pseudolites (for example, a terrestrial positioning system using fixed ranging code transmission towers, or aerial positioning systems using balloons or manned or unmanned aircraft).

In other aspects, such systems also include, for example, CDMA-based communications systems or Time Division Multiple Access (TDMA) based communication systems or navigation systems configured to use PRN ranging signals.

SUMMARY

An illustrative embodiment provides a method of generating a composite pseudo random noise (PRN) code. The method comprises receiving, by a PRN receiver, a wireless transmission having a noisy received original PRN code multiplexed with navigation data. A noiseless local replica original PRN code is generated within the PRN receiver. A noiseless local replica compressed PRN code is then generated based on the noiseless local replica original PRN code. The noiseless local replica compressed PRN code has the same length as the noiseless local replica original PRN code and a higher chip rate. A sample-to-sample multiplication operation on the noisy received original PRN code and the noiseless local replica compressed PRN code generates a noisy received composite PRN code. The received wireless transmission is then tracked according to the noisy received composite PRN code.

Another illustrative embodiment provides a system for generating a composite pseudo random noise (PRN) code. The system comprises a storage device that stores program instructions and one or more processors operably connected to the storage device and configured to execute the program instructions to cause the system to: receive, by a PRN receiver, a wireless transmission having a noisy received original PRN code multiplexed with navigation data; generate a noiseless local replica original PRN code is generated within the PRN receiver; generate a noiseless local replica compressed PRN code based on the noiseless local replica original PRN code, wherein the noiseless local replica compressed PRN code has the same length as the noiseless local replica original PRN code, and wherein the noiseless local replica compressed PRN code has a higher chip rate than the noiseless local replica original PRN code; perform a sample-to-sample multiplication operation on the noisy received original PRN code and the noiseless local replica compressed PRN code to generate a noisy received composite PRN code; and track the received wireless transmission according to the noisy received composite PRN code.

Another illustrative embodiment provides a computer program product for generating a composite pseudo random noise (PRN) code. The computer program product comprises a computer-readable storage medium having program instructions embodied thereon to perform the operations of: receiving, by a PRN receiver, a wireless transmission having a noisy received original PRN code multiplexed with navigation data; generating a noiseless local replica original PRN code is generated within the PRN receiver; generating a noiseless local replica compressed PRN code based on the noiseless local replica original PRN code, wherein the noiseless local replica compressed PRN code has the same length as the noiseless local replica original PRN code, and wherein the noiseless local replica compressed PRN code has a higher chip rate than the noiseless local replica original PRN code; performing a sample-to-sample multiplication operation on the noisy received original PRN code and the noiseless local replica compressed PRN code to generate a noisy received composite PRN code; and tracking the received wireless transmission according to the noisy received composite PRN code.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 depicts a table mapping of two inputs and output of the sample-to-sample multiplication function in accordance with an illustrative embodiment;

FIG. 13 depicts a flowchart illustrating a process for generating a composite PRN code in accordance with an illustrative embodiment;

DETAILED DESCRIPTION

Figure 1:
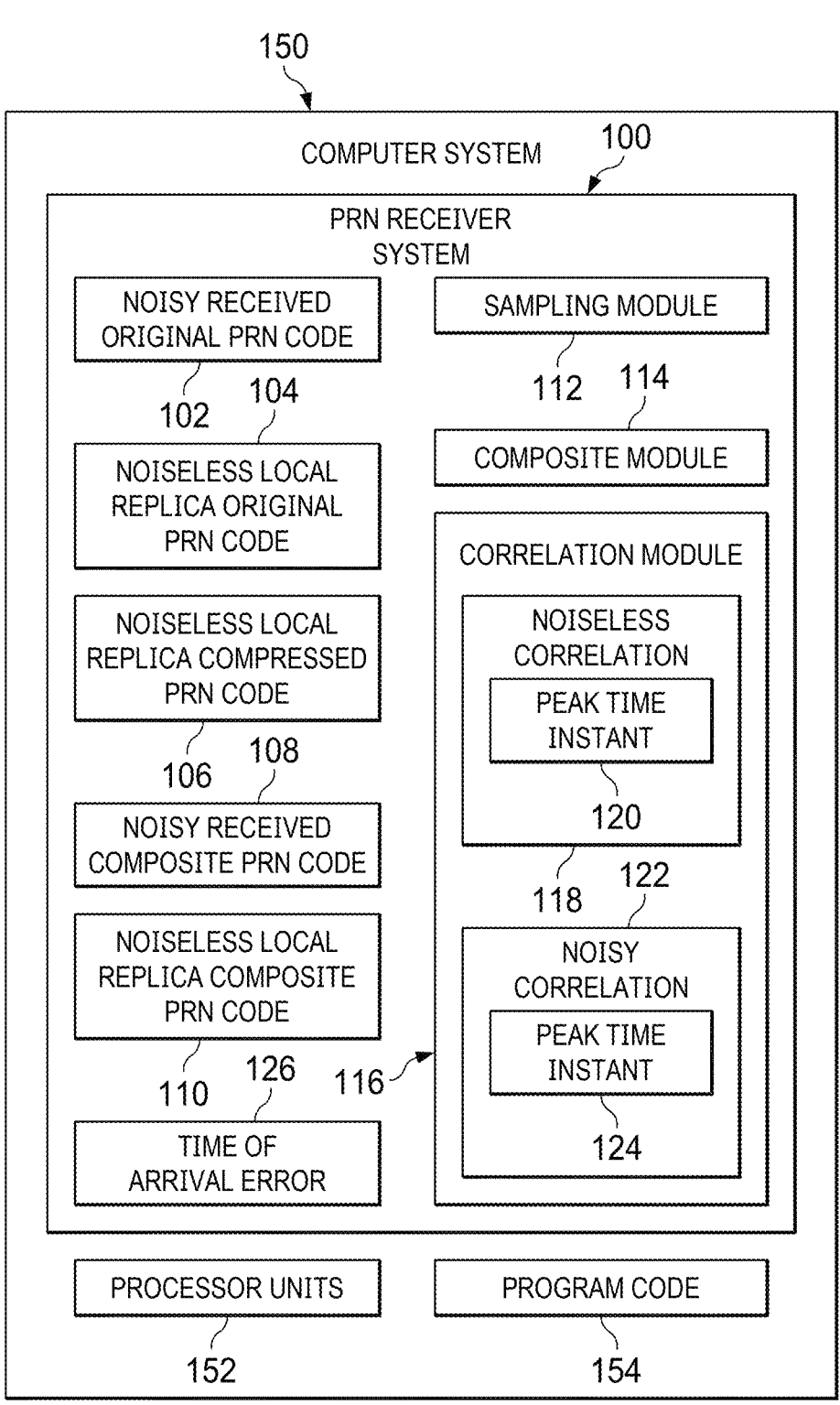
FIG. 1 is an illustration of a block diagram of a PRN receiver system in accordance with an illustrative embodiment.

The illustrative embodiments recognize and take into account that conventional systems using PRN codes for ranging purposes generally are based on the PRN receiver's ability to correlate a received PRN code from the PRN transmitter with a local replica (stored or generated by the PRN receiver). When a PRN code is received by the PRN receiver and correlated with a local replica, the PRN receiver is able to determine an estimate of range between the PRN receiver and the PRN transmitter based on the navigation data multiplexed on the received PRN code. The characteristics of correlation between a received PRN code and a local replica are greatly influenced by the chip rate of the PRN code.

The illustrative embodiments also recognize and take into account that typically, a higher chip rate (e.g., the rate at which the PRN code chips transition) of a PRN code provides greater ranging accuracy and lower time of arrival error estimation because there is a steeper autocorrelation peak generated when correlating the received PRN code with a local replica at a higher chip rate.

The illustrative embodiments also recognize and take into account that, in conventional systems, there are also drawbacks to employing a PRN code with a higher chip rate. PRN codes with higher chip rates require greater signal bandwidth. Furthermore, conventional PRN receiver hardware typically includes a filter or pre-filter to attenuate noise and/or interfering signals outside that bandwidth. However, this filtering will inherently filter part of the received PRN code's bandwidth and unintentionally reduce signal resolution. This filtering has the intrinsic effect of filtering out the high frequency components of PRN codes of high chip rates, thereby rendering the higher chip rate PRN codes ineffective since.

The illustrative embodiments also recognize and take into account that a composite Pseudo Random Noise (PRN) code needs to have the same length as that of an original PRN code, thus the composite PRN code does not cross data boundary (data can be navigation data or others).

The illustrative embodiments provide a method of assembling a given PRN code and its compressed version (decimated version) to form a composite PRN code with a higher effective chip rate than the chip rate of the given PRN code. This composite PRN code provides benefits including narrower null-to-null correlation mainlobe and more accurate tracking error/lower time of arrival (TOA) error under same operating conditions.

The illustrative embodiments can be used for many CDMA applications including CDMA systems, satellite navigation tracking, etc. for the U.S. and foreign entities (e.g. Europe Union, Russia, India, Japan, China, etc.). The illustrative embodiments can work with either one constellation or multiple constellations of navigation satellites.

In addition, the method is a high-precision approach that can supports rapid suborbital cargo delivery through space, autonomous reentry capsules, reusable manned spacecraft, reusable unmanned space vehicles, reusable launch vehicles, unmanned spacecraft from low-earth orbit (LEO) to geosynchronous equatorial orbit (GEO), unmanned spacecraft to CisLunar (space between the earth and the moon), autonomous orbit transfer and space resupply vehicles, autonomous refueling platforms, and fully autonomous passenger aircraft.

With reference now to FIG. 1, an illustration a block diagram of a PRN receiver system is depicted in accordance with an illustrative embodiment. PRN receiver system 100 provides for a higher effective chip rate by assembling a given PRN code and its compressed version (decimated version) to form a composite PRN code with a higher effective chip rate than the chip rate of the given PRN code.

PRN codes described herein include Coarse Acquisition (C/A) codes used in GPS applications by GPS receivers. However, in other aspects, the PRN codes include any suitable ranging signal, including those employed in, for example, CDMA-based communications systems, GNSS positioning systems, and/or pseudolites using PRN codes for ranging purposes.

PRN receiver system 100 receives a noisy received original PRN code 102 from a PRN transmitter (not shown). Noisy received original PRN code 102 may be noisy from the transition environment, receiving environment and transmission medium in between.

PRN receiver system 100 generates a noiseless local replica original PRN code 104.

Sampling module 112 generates a noiseless local replica compressed PRN code 106 from noiseless local replica original PRN code 104. The compression can be performed by taking d samples from the local replica original PRN code 104 out of every n consecutive samples, wherein d<n, where d and n are positive integers. As a result, if d=1, noiseless local replica compressed PRN code 106 has a chip rate that is n times that of noiseless local replica original PRN code 104.

Composite module 114 generates a noisy received composite PRN code 108 from the noisy received original PRN code 102 and noiseless local replica compressed PRN code 106 by performing a sample-to-sample multiplication operation.

Composite module 114 also generates a noiseless local received replica composite PRN code 110 from the noiseless local replica original PRN code 104 and noiseless local replica compressed PRN code 106 by performing a sample-to-sample multiplication operation.

Correlation module 116 correlates the noiseless local replica composite PRN code 110 with itself to determine noiseless correlation 118. Correlation module 116 also correlates the noisy received composite PRN code 108 with the noiseless local replica composite RPN code 110 to determine noisy correlation 122. (See FIG. 2).

Noiseless correlation 118 has a peak time instant 120. Similarly, noisy correlation 122 also has a respective peak time instant 124. Correlation module 116 estimates time of arrival error 126 by subtracting the peak time instant 120 of the noiseless correlation 118 from the peak time instant 124 of the noisy correlation 122.

PRN receiver system 100 can be implemented in software, hardware, firmware, or a combination thereof. When software is used, the operations performed by PRN receiver system 100 can be implemented in program code configured to run on hardware, such as a processor unit. When firmware is used, the operations performed by PRN receiver system 100 can be implemented in program code and data and stored in persistent memory to run on a processor unit. When hardware is employed, the hardware can include circuits that operate to perform the operations in PRN receiver system 100.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 150 is a physical hardware system and includes one or more data processing systems. When more than one data processing system is present in computer system 150, those data processing systems are in communication with each other using a communications medium. The communications medium can be a network. The data processing systems can be selected from at least one of a computer, a server computer, a tablet computer, or some other suitable data processing system.

As depicted, computer system 150 includes a number of processor units 152 that are capable of executing program code 154 implementing processes in the illustrative examples. As used herein a processor unit in the number of processor units 152 is a hardware device and is comprised of hardware circuits such as those on an integrated circuit that respond and process instructions and program code that operate a computer. When a number of processor units 152 execute program code 154 for a process, the number of processor units 152 is one or more processor units that can be on the same computer or on different computers. In other words, the process can be distributed between processor units on the same or different computers in a computer system. Further, the number of processor units 152 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 2:
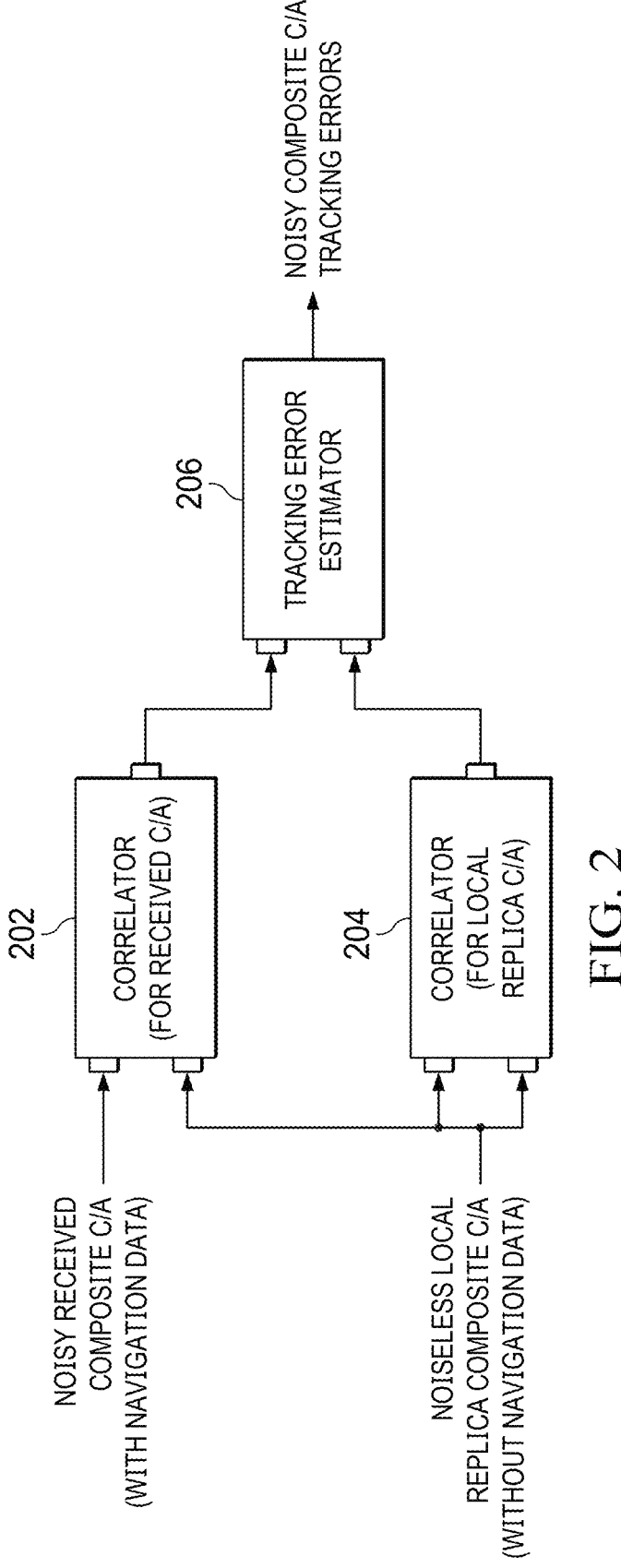
FIG. 2 depicts a block diagram illustrating the operation of a correlation module in accordance with an illustrative embodiment.

FIG. 2 depicts a block diagram illustrating the operation of a correlation module in accordance with an illustrative embodiment. FIG. 2 is an example implementation of correlation module 116 in FIG. 1.

A noisy received composite C/A code with navigation data is fed into correlator 202 for the received C/A along with a noiseless local replica composite C/A. As explained above, the noiseless local replica composite C/A is derived by sample-to-sample multiplication of a noiseless local replica original C/A and a noiseless local replica compressed C/A. Correlator 202 determines the noisy correlation and its peak time instant, which is fed into a tracking error estimator 206.

The noiseless local replica composite C/A is correlated with itself by correlator 204 for local replica C/A, which determined the noiseless correlation and its peak time instant, which is also fed into tracking error estimator 206. Tracking error estimator 206 then determines noisy composite C/A tracking errors according to the difference between the noisy correlation and noiseless correlations peak time instances.

The objective of forming a composite PRN code is that it has a higher effective chip rate than the chip rate of the given received original PRN code. Having a higher effective chip rate is the same as stating that the composite PRN code has a shorter effective chip period than the chip period of the original PRN code. This composite PRN code may behave like a new PRN code having higher chip rate than the original PRN code and, therefore, is able to provide enhanced benefits over the original PRN code.

These benefits include but are not limited to a narrower null-to-null correlation mainlobe and less tracking error/lower time of arrival (TOA) error than that of the original PRN code under the following operating conditions: same code power as that of the given original PRN code; same pre-detection integration; same correlator and narrower effective correlator spacing (Effective correlator spacing is chip spacing that a code tracking loop needs to stay in track of the incoming original PRN code. The effective correlator spacing for the original PRN code is two original code chips. For the composite PRN code, whose effective chip period is shorter than that of the original PRN code since its effective chip rate is higher than that of the original PRN code, the effective correlator spacing for the composite PRN code is shorter than that of the original PRN code); same delay locked loop (discriminator, loop filter, numerical control oscillator, loop noise bandwidth, etc.), often abbreviated as DLL or named code tracking loop; and same sampling rate.

Figure 3A:
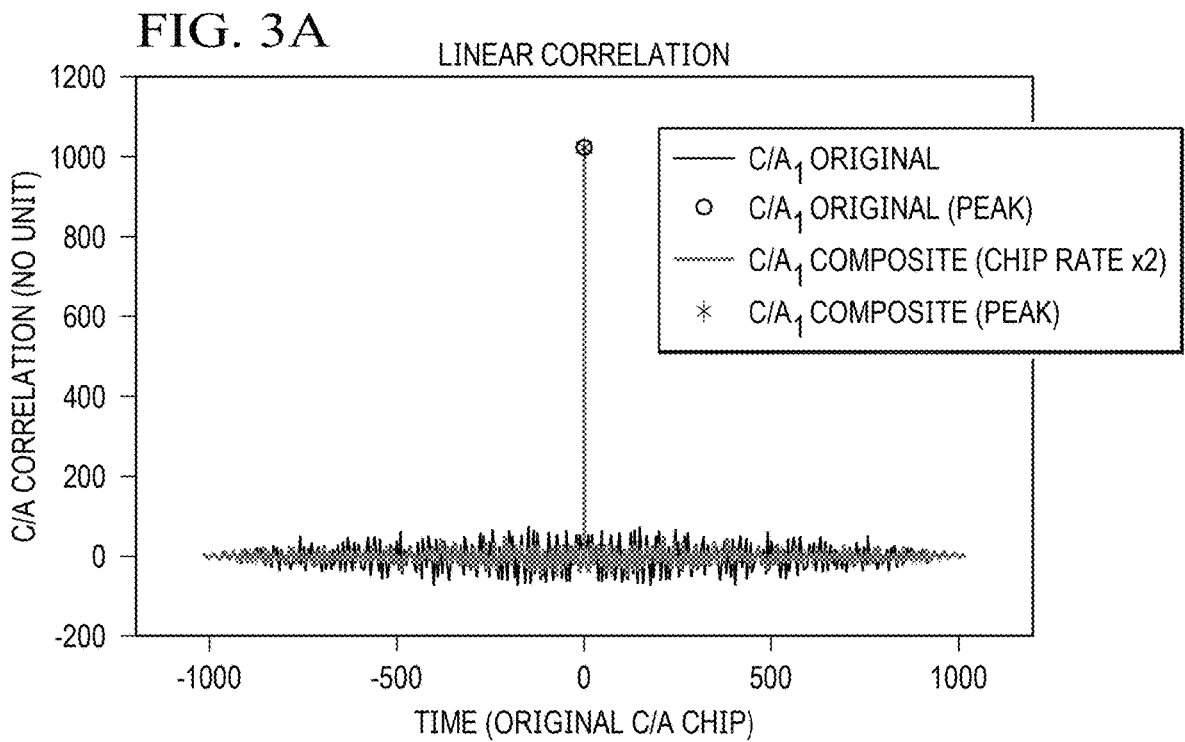
FIG. 3A depicts a graph illustrating the linear correlation of the original PRN code and linear correlation of the composite PRN code demonstrates this point in accordance with an illustrative embodiment.
Figure 3B:
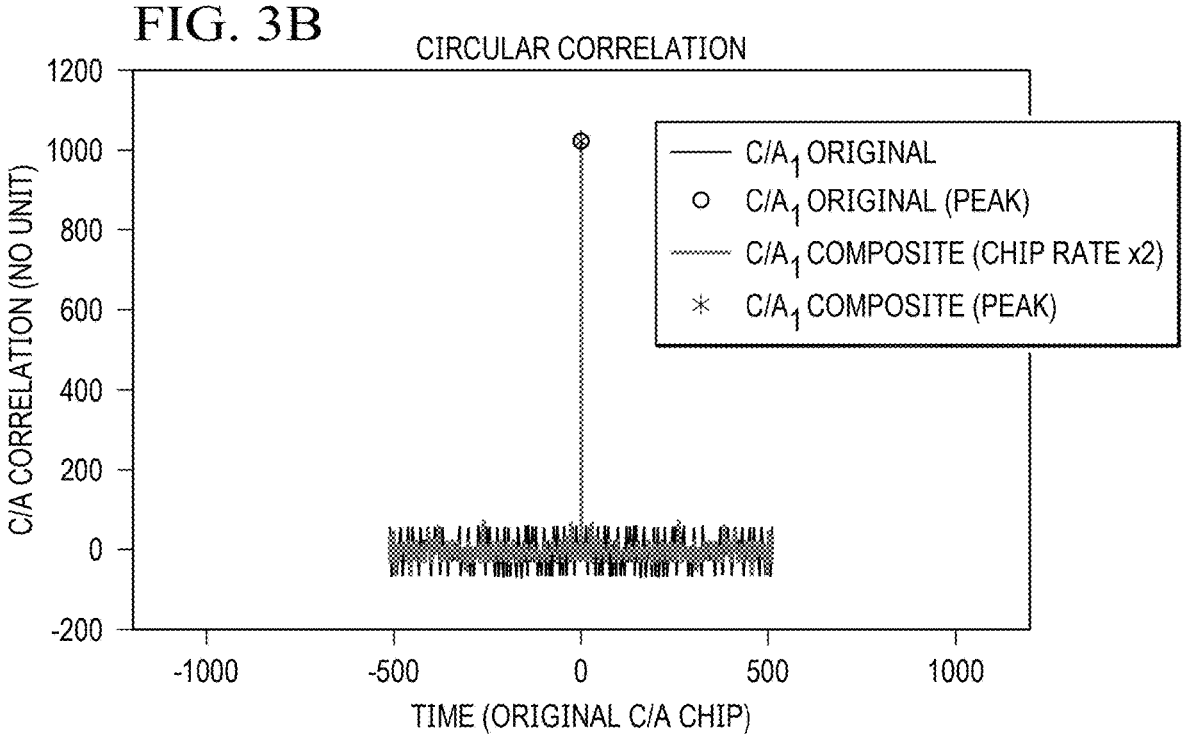
FIG. 3B depicts a graph illustrating circular correlation of the original PRN code and circular correlation of the composite PRN code in accordance with an illustrative embodiment.

FIG. 3A depicts a graph illustrating the linear correlation of the original PRN code and linear correlation of the composite PRN code demonstrates this point. FIG. 3B depicts a graph illustrating circular correlation of the original PRN code and circular correlation of the composite PRN code.

In addition to achieving higher effective chip rate in the composite PRN code, some care is exercised such that the composite PRN code has either equivalent or even enhanced correlation properties with respect to the given original PRN code, if possible. These correlation properties include the ratio between the correlation peak and correlation sidelobes of the composite PRN code being equivalent to or higher than that of the original PRN code such that the code tracking performance in the receiving end can be maintained or improved. Otherwise, the code tracking performance of the composite PRN code will likely degrade if correlation sidelobes of the composite PRN code are higher than any tracking threshold used against tracking the given original PRN code.

Figure 4A:
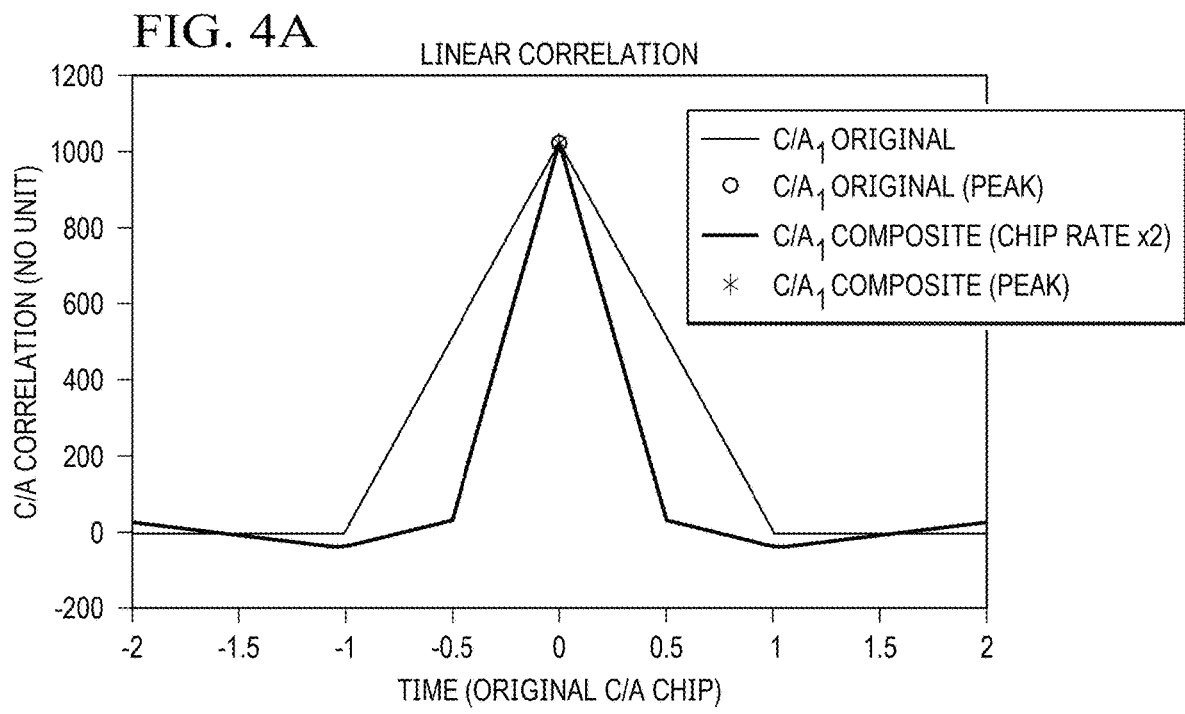
FIG. 4A shows a zoomed in view of linear correlation from FIG. 3A.
Figure 4B:
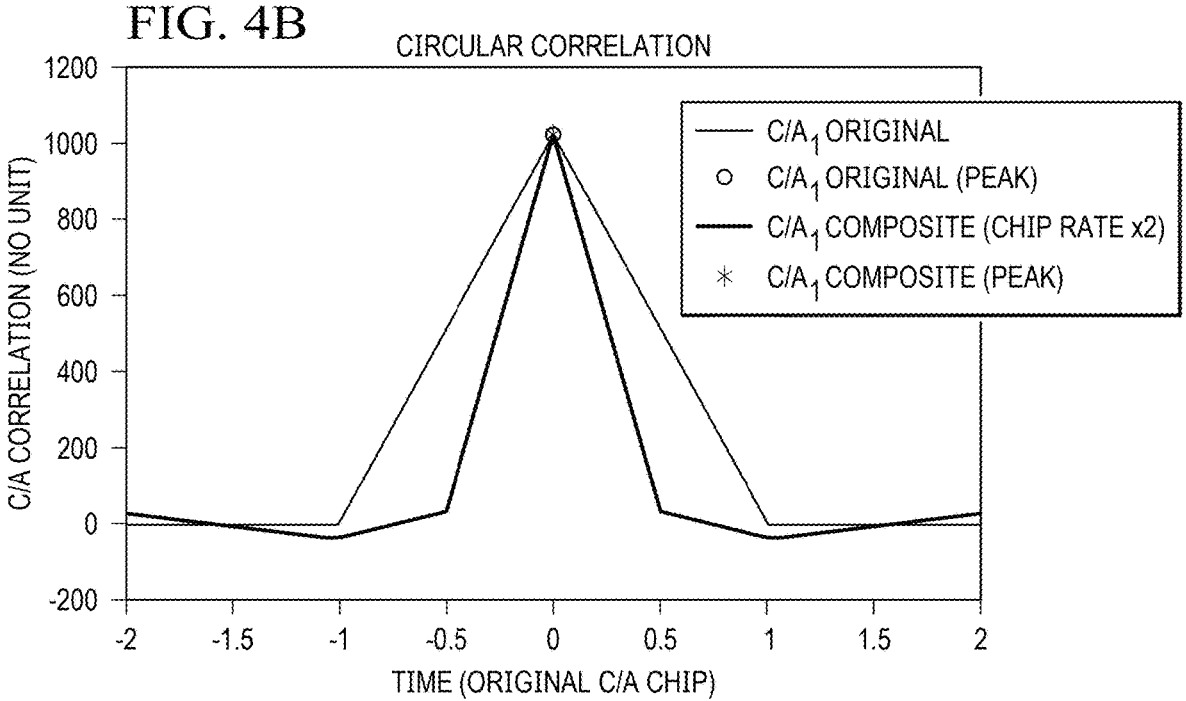
FIG. 4B shows a zoomed in view of circular correlation from FIG. 3B.

FIGS. 4A and 4B show zoomed in view of linear correlation and circular correlation from FIGS. 3A and 3B, respectively.

For the sake of example, a C/A code is used herein as the given original PRN code (other PRN codes are good candidates as well). A C/A code is a PRN code used in GPS applications and it stands for coarse acquisition. Note that 'C/A$_1$ Original' in legend in FIGS. 3A and 3B is the given original PRN code. The composite C/A$_1$ code has chip rate that is at twice of the chip rate of that of the original C/A$_1$ code.

It is well known that DLL (Delay Locked Loop) can perform code tracking on a PRN code to give a time of arrival error estimate through analyses. When the original PRN code has a relatively short period (e.g., one millisecond), circular convolution on a one-millisecond basis is often used as a part for code tracking.

Given an original PRN code (e.g., C/A$_1$) at some known chip rate, one may assemble it with its compressed version to form a composite PRN code of higher effective chip rate than the original C/A$_1$ code. The compressed version has the same C/A$_1$ code as the original but at a higher chip rate.

The illustrative embodiments form the compressed version of C/A$_1$ code by decimating the original PRN code (for example, decimate by taking 1 out of every N consecutive samples of the original C/A$_1$ code, where N is a positive integer such as 2, 3, and so on). For example, for N=2, the compressed C/A$_1$ code will have a chip rate that is twice of that of the original C/A$_1$; for N=3, the compressed C/A$_1$ code will have chip rate that is three times of that of the original C/A$_1$, etc.

Thus, for a positive integer N and decimate by taking 1 out of every N consecutive samples of the original C/A$_1$ code, the compressed C/A$_1$ code will have a chip rate that is N times of that of the original C/A$_1$ code. When N is a positive real number that is greater than 1, it can be expressed in a ratio of two integers: unitLength and subUnitLength. The unitLength and subUnitLength are numerator and deonominator, respectively, of the ratio equal to N (where unitLength=N and subUnitLength=1). The compressed version of C/A$_1$ code is formed by taking consecutive subUnitLength number of samples out of every consecutive unitLength number of samples of the original C/A$_1$ code. For N that is either a positive integer or a real number that is greater than 1, the original C/A$_1$ code needs to repeat itself (i.e., form a long sequence of original C/A$_1$ code by repeating the original C/A$_1$ code) such that the length of the compressed C/A$_1$ code, once formed, would be the same length as that of the original C/A$_1$ code.

This repetition is an important feature as it guarantees that the compressed C/A$_1$ code, having the same length as that of the original C/A$_1$ code, will produce a composite C/A$_1$ code that is the same length as that of the original C/A$_1$ code. The composite C/A$_1$ code, having the same length as that of the original C/A$_1$ code, will not disturb any data boundary (e.g. navigation data) that is time-multiplexed on the original C/A$_1$ code. Once the compressed C/A$_1$ code is formed, the algorithm performs multiplication on the original C/A$_1$ code and the compressed C/A$_1$ code on a sample-to-sample basis to form the composite C/A$_1$ code.

FIG. 5 depicts a table mapping of two inputs and output of the multiplication function in accordance with an illustrative embodiment. Since chips of an original C/A$_1$ code has an amplitude of either +1 or −1, the outcome of the multiplication function is equivalent to numerically multiplying both inputs together on a sample-to-sample basis.

Figure 6:
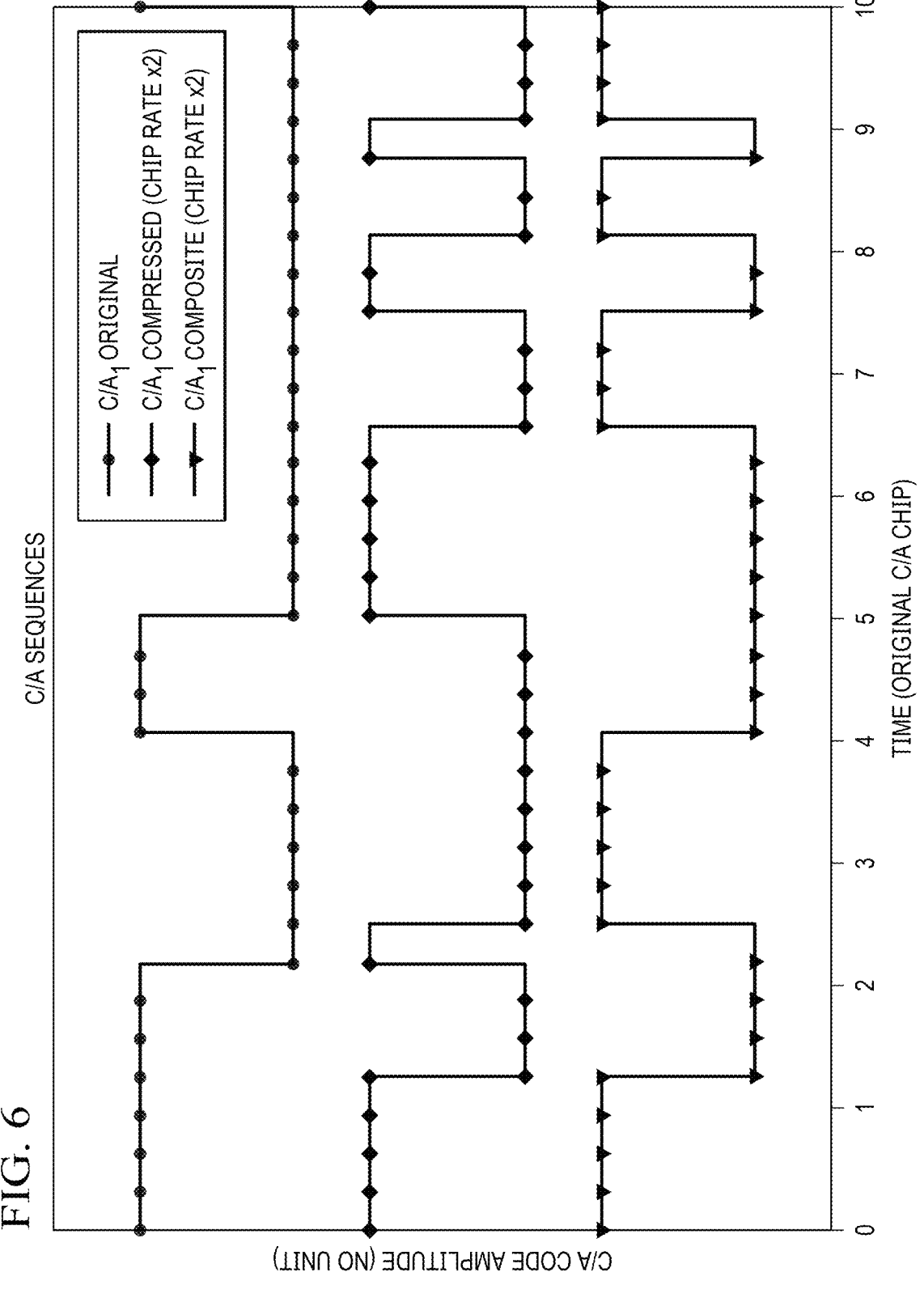
FIG. 6 depicts a graph illustrating the numerical multiplication of the original C/A$_1$ code and the compressed C/A$_1$ code on the sample-to-sample basis in accordance with an illustrative embodiment.

FIG. 6 depicts a graph illustrating the numerical multiplication of the original C/A$_1$ code and the compressed C/A$_1$ code on the sample-to-sample basis in accordance with an illustrative embodiment. Each sample from the C/A$_1$ code is denoted by a dot.

FIG. 6 shows the assembling process of forming the composite C/A$_1$ code from the original C/A$_1$ code and the compressed C/A$_1$ code without passing any original codes through a band-limiting device such as a bandpass filter (BPF).

Figure 7:
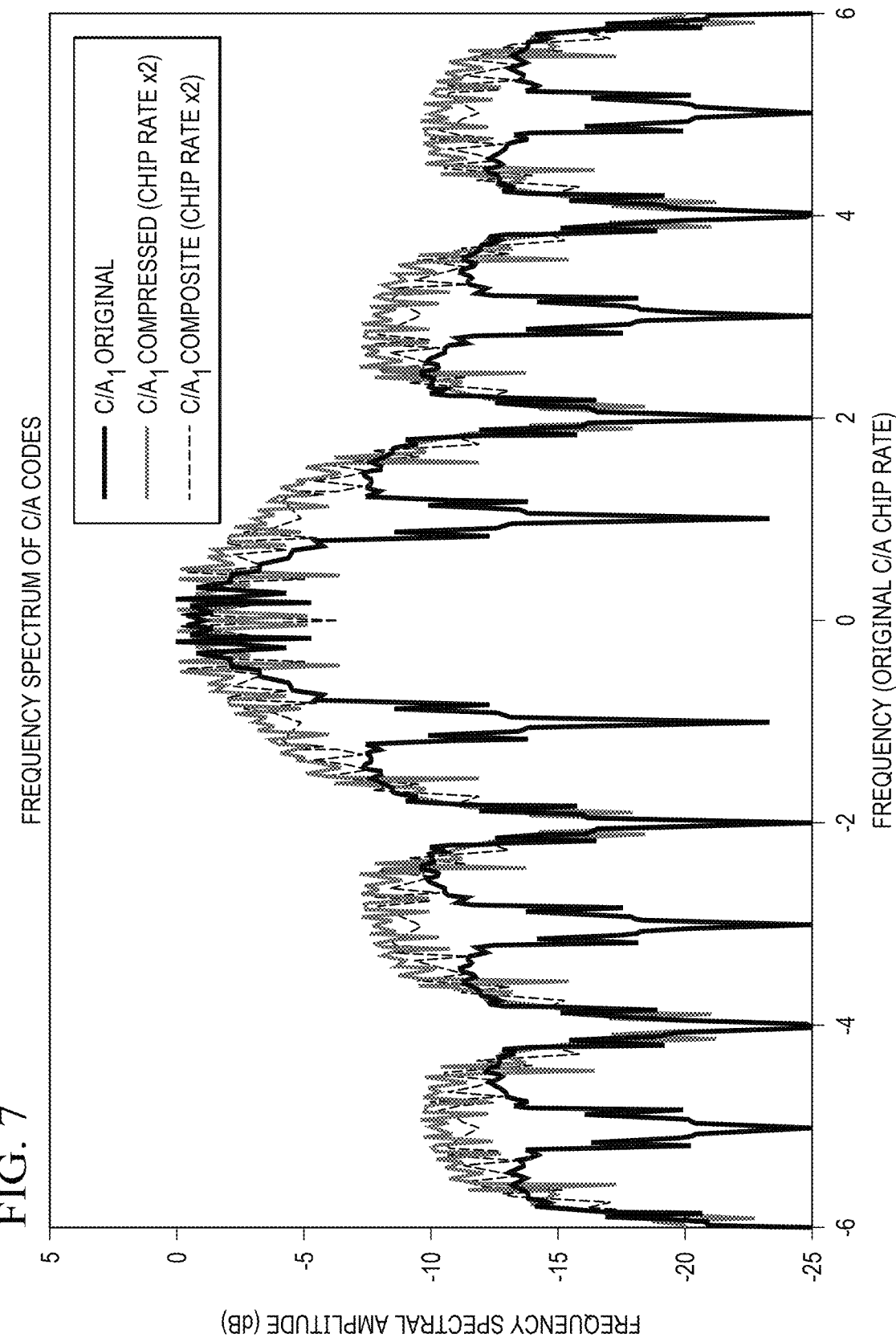
FIG. 7 depicts a graph illustrating the frequency spectrums of the original C/A$_1$ code, the compressed C/A$_1$ code and the composite C/A$_1$ code in accordance with an illustrative embodiment.

FIG. 7 depicts a graph illustrating the frequency spectrums of the original C/A$_1$ code, the compressed C/A$_1$ code and the composite C/A$_1$ code in accordance with an illustrative embodiment. The frequency spectrums provide more code details, specifically their chip rates.

Since Binary Phase Shift Keying (BPSK) modulation is applied to all three codes, the first null of the spectrum in the positive frequency axis of each code shows the chip rate of the corresponding code.

Therefore, the original C/A$_1$ shows its first null in the positive frequency axis at 1 'original C/A chip rate.' Likewise, both compressed C/A$_1$ and composite C/A$_1$ show their respective first nulls at 2 'original C/A chip rate' as expected.

Figure 8A:
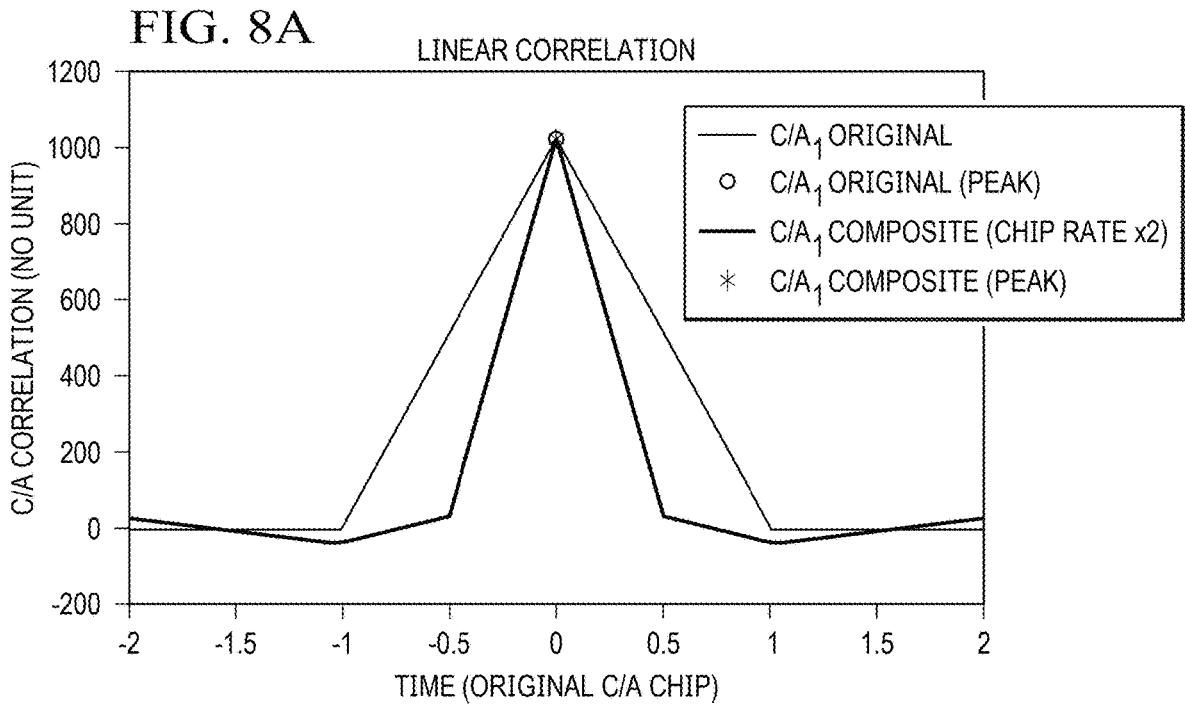
FIG. 8A depicts a graph illustrating linear correlation of the original C/A$_1$ code and linear correlation of the composite C/A$_1$ code in accordance with an illustrative embodiment.
Figure 8B:
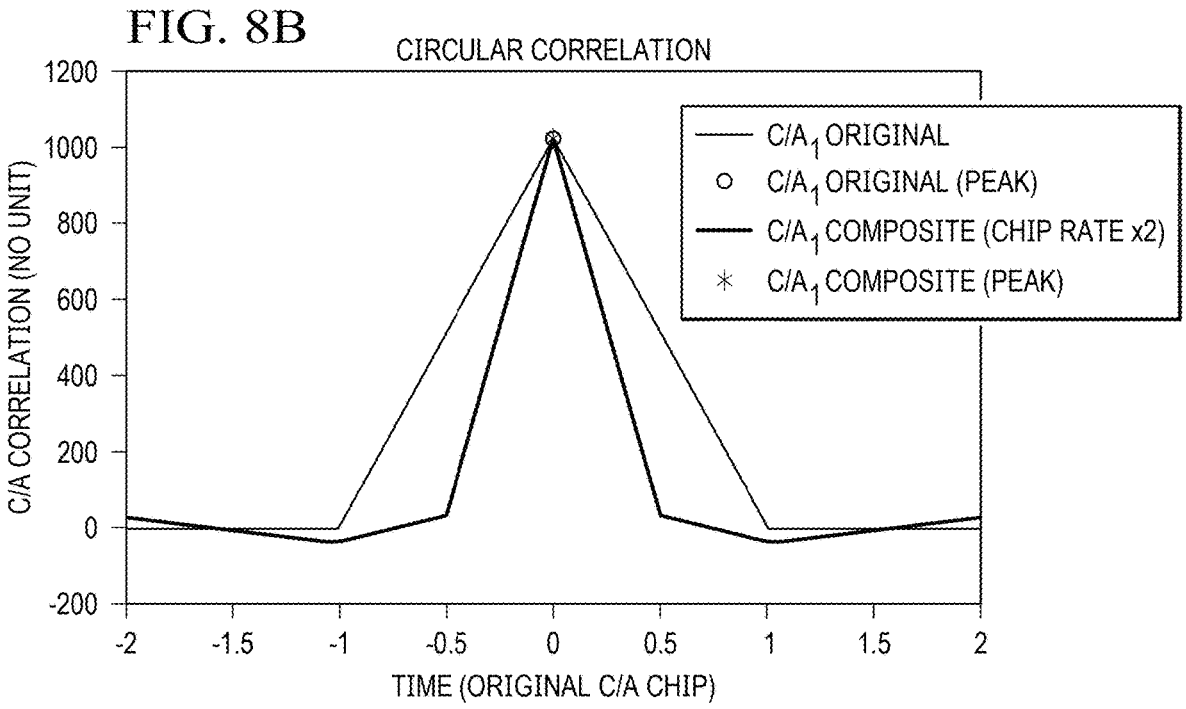
FIG. 8B depicts a graph illustrating circulate correlation of the original C/A$_1$ code and circulate correlation of the composite C/A$_1$ code in accordance with an illustrative embodiment.

FIG. 8A depicts a graph illustrating linear correlation of the original C/A$_1$ code and linear correlation of the composite C/A$_1$ code. FIG. 8B depicts a graph illustrating circulate correlation of the original C/A$_1$ code and circulate correlation of the composite C/A$_1$ code.

FIGS. 8A and 8B show the null-to-null correlation mainlobe of the original C/A$_1$ code (i.e., null-to-null correlation mainlobe is the base of the isosceles triangle from −1 to +1). It is obvious that the mainlobe of the composite C/A$_1$ code (i.e., null-to-null correlation mainlobe is the base of the isosceles triangle from −0.5 to +0.5) is half of that of the original C/A$_1$ code. This ratio is consistent with the fact that the mainlobe of the composite C/A$_1$ code in its frequency spectrum is twice as wide as that of the original C/A$_1$ code.

Once the composite PRN code (at its higher effective chip rate) is formed through the abovementioned process, its time of arrival accuracy performance will improve. One may assume that the composite C/A$_1$ code is assembled from a received noisy original C/A$_1$ code (the received original C/A$_1$ code multiplexed with navigation data) and a compressed C/A$_1$ code formed from a noiseless original C/A$_1$ code. The noise in the received noisy original C/A$_1$ code is assumed to be additive Gaussian white noise. This is named the received noisy composite C/A$_1$ code. This method of the illustrative embodiments can also be used to form a noiseless composite C/A$_1$ code, which is named the local replica noiseless composite C/A$_1$ code.

Figure 9:
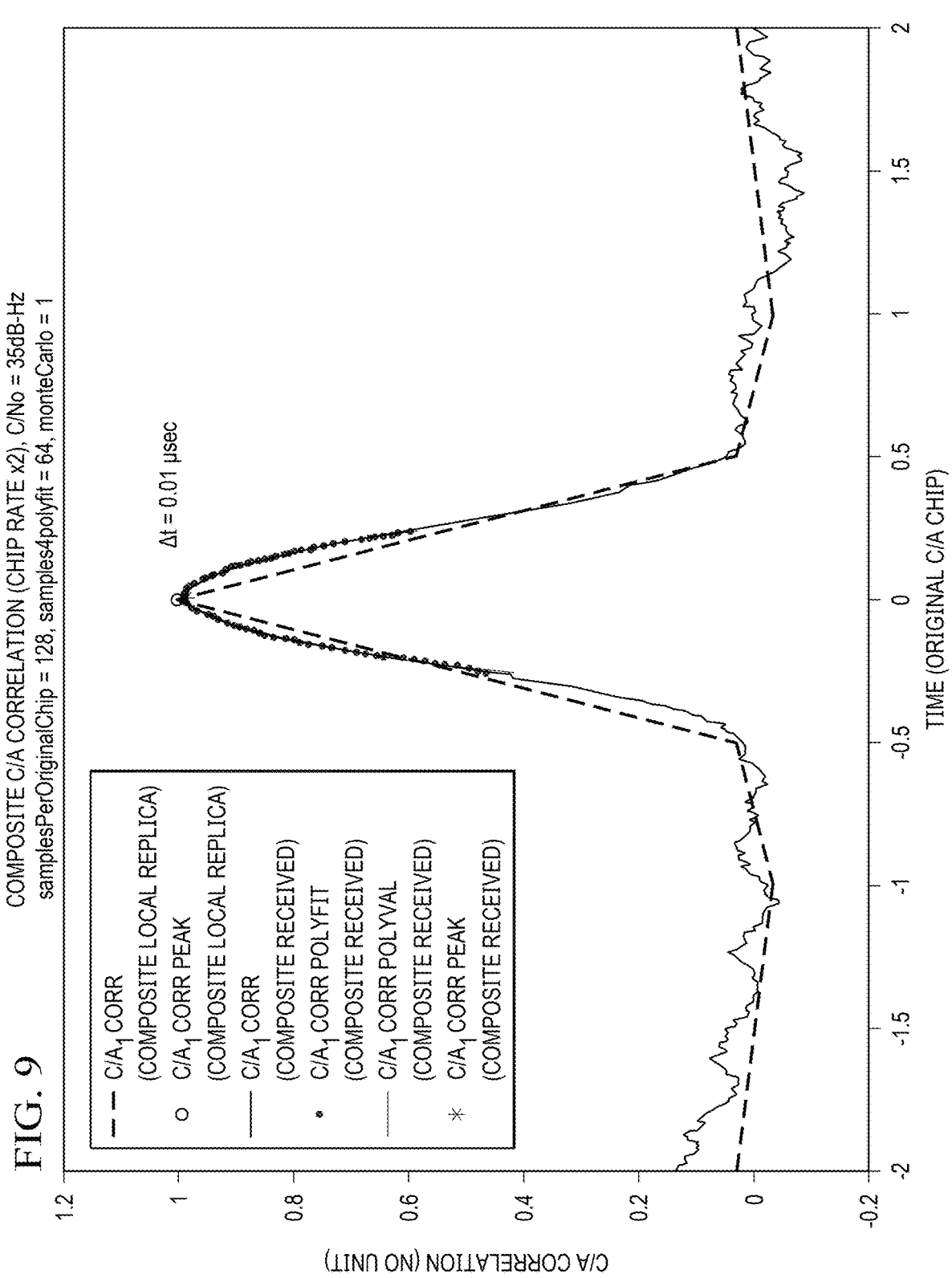
FIG. 9 depicts a graph illustrating the noisy peak time instant and the noiseless peak time instant in accordance with an illustrative embodiment.

FIG. 9 shows both the noiseless correlation and the noisy correlation. The illustrative embodiments use two correlations to examine time of arrival accuracy performance of the composite $C/A_1$ code. One correlation is formed based on local replica noiseless composite $C/A_1$ code and itself. This is called noiseless correlation. The second correlation is formed based on received noisy composite $C/A_1$ code and local replica noiseless composite $C/A_1$ code. This is called noisy correlation.

Often a DLL is applied to estimate time of arrival error. The illustrative embodiments provide an alternate approach. This approach determines estimated time of arrival error by checking the statistics of the time instant corresponding to the peak of the noisy correlation (noisy peak time instant) with respect to the time instant corresponding to the peak of the noiseless correlation (noiseless peak time instant). The time of arrival error is defined as the noiseless peak time instant subtracted from the noisy peak time instant.

Note that noisy peak time instant is the time instant corresponds to the peak of the quadratic polynomial fit of the noisy correlation.

FIG. 9 depicts a graph illustrating the noisy peak time instant (the asterisk) and the noiseless peak time instant (the black circle). The estimate time of arrival error is also shown (0.01 microseconds). This is one case of estimate time of arrival error at a C/No=35 dB–Hz.

Figure 10:
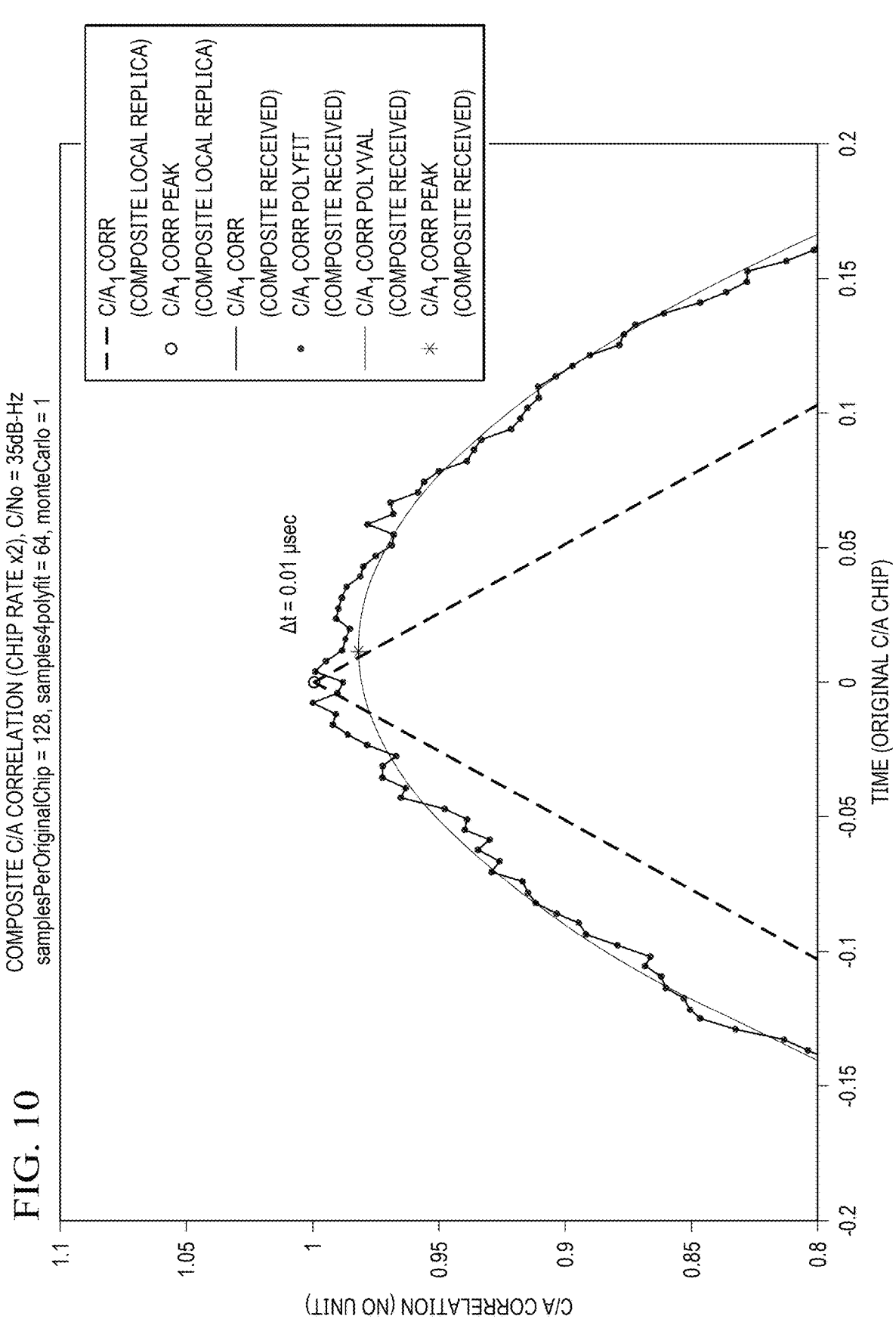
FIG. 10 depicts a zoomed in view of the relationship between the noisy peak time instant (the asterisk) and the noiseless peak time instant (the black circle) in FIG. 9.

FIG. 10 depicts a zoomed in view of the relationship between the noisy peak time instant (the asterisk) and the noiseless peak time instant (the black circle) in FIG. 9.

Since the estimate time of arrival error is a random parameter as the noise in the received noisy composite $C/A_1$ code is random, an asymptotic error can be achieved via a Monte Carlo process by running the same estimate time of arrival error at a fixed C/No over a high number of loops (e.g., 1000 runs).

Figure 11:
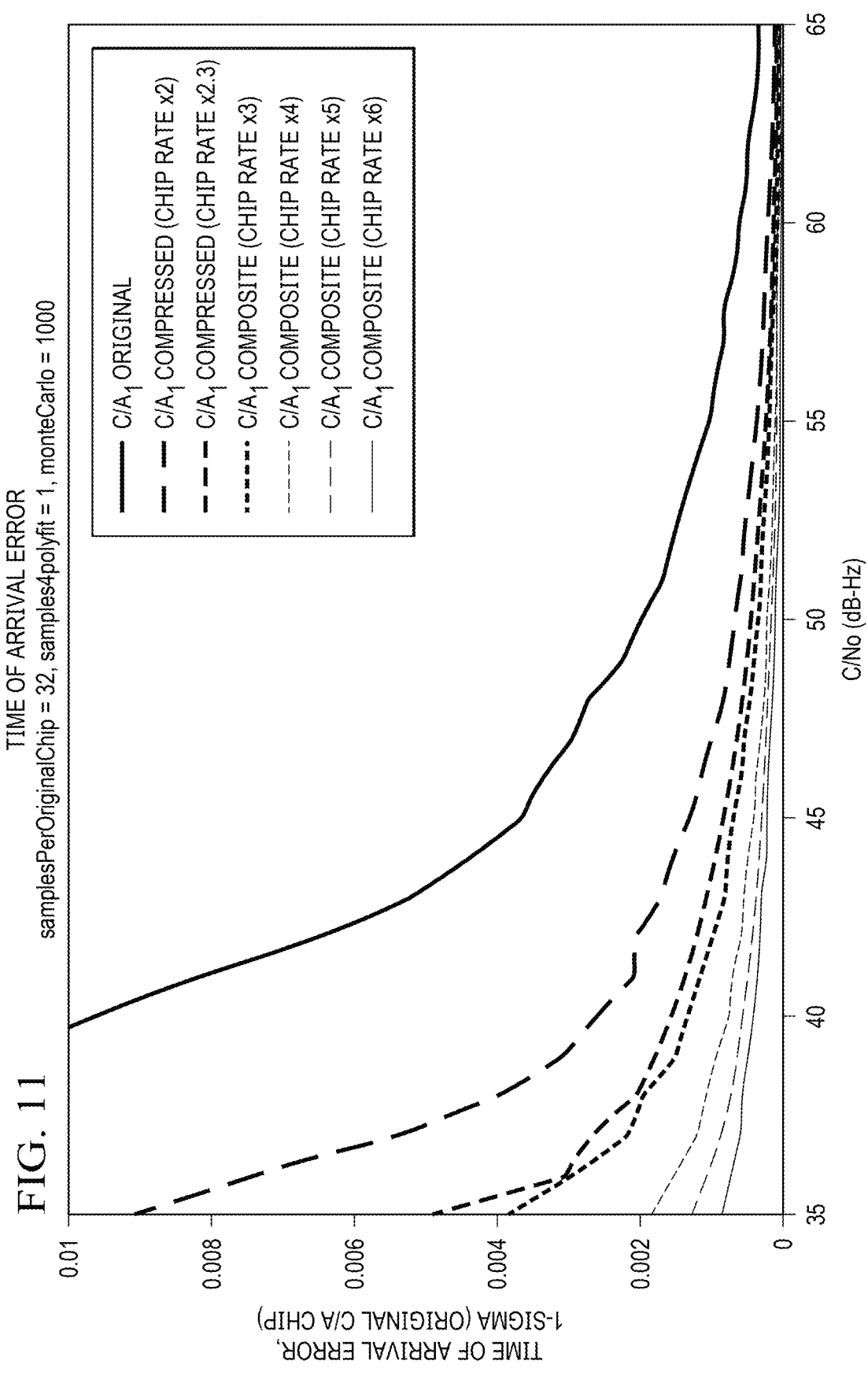
FIG. 11 depicts a graph illustrating the time of arrival accuracy based on the peak instant of correlation of the original code and composite codes of various chip rates in accordance with an illustrative embodiment.

FIG. 11 depicts a graph illustrating the time of arrival accuracy of the original code and composite codes of various chip rates in accordance with an illustrative embodiment. As the chip rate in the composite code increases, the time of arrival error becomes smaller/lower.

Figure 12:
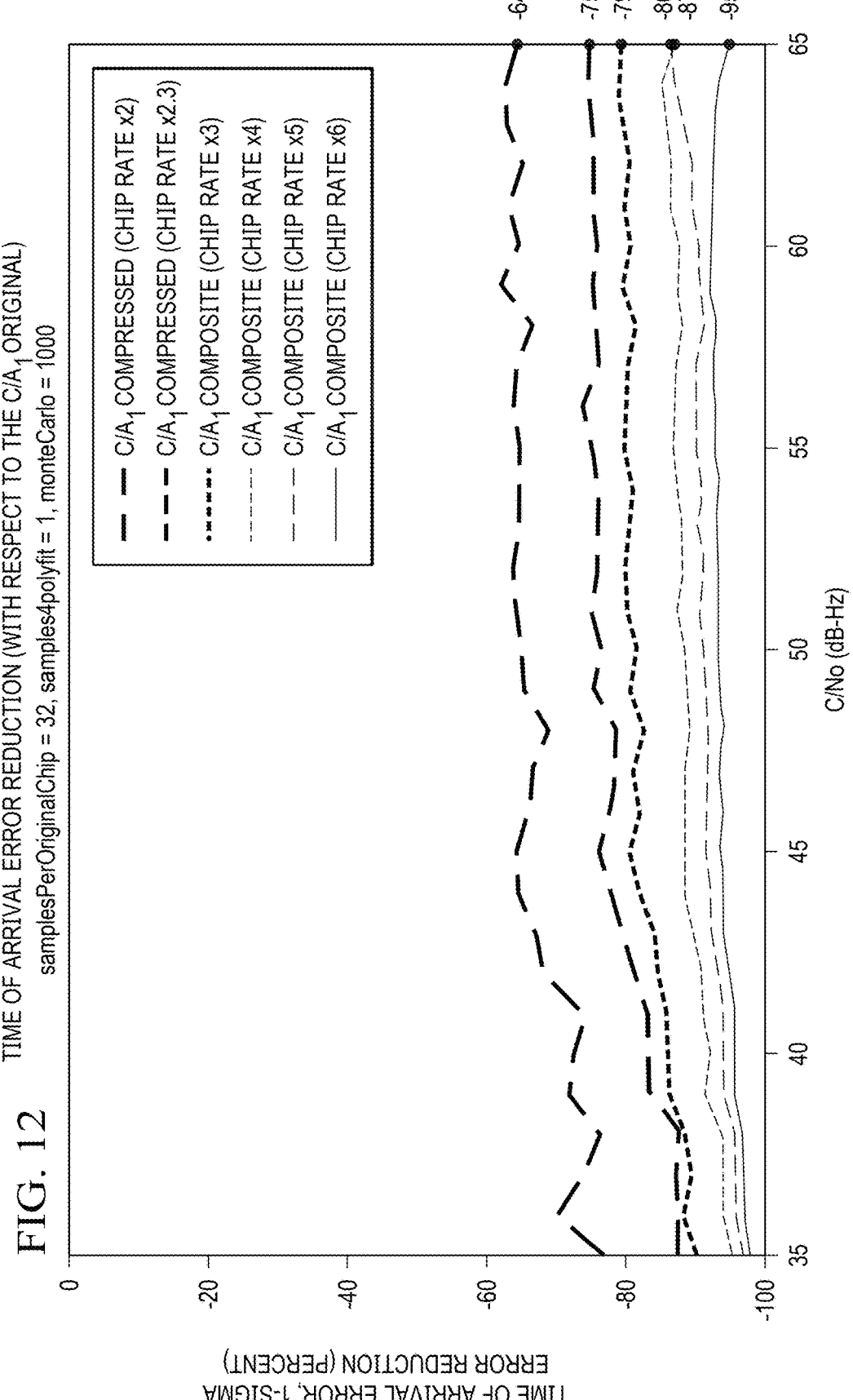
FIG. 12 depicts a graph illustrating time of arrival error reduction (in %) with respect to the original code in accordance with an illustrative embodiment.

FIG. 12 depicts a graph illustrating time of arrival error reduction (in %) with respect to the original code in accordance with an illustrative embodiment.

FIG. 13 depicts a flowchart illustrating a process for generating a composite PRN code in accordance with an illustrative embodiment. Process 1300 can be carried out in PRN receiver system 100 in FIG. 1.

Process 1300 begins by a PRN receiver receiving a wireless transmission having a noisy received original PRN code multiplexed with navigation data (operation 1302).

A noiseless local replica original PRN code is generated within the PRN receiver (operation 1304). A noiseless local replica compressed PRN code is then generated based on the noiseless local replica original PRN code (operation 1306). The noiseless local replica compressed PRN code has the same length as the noiseless local replica original PRN code. The noiseless local replica compressed PRN code also has a higher chip rate than the noiseless local replica original PRN code.

The noiseless local replica compressed PRN code can be generated by taking samples from the noiseless local replica original PRN code out of every consecutive samples, wherein ≤, and wherein and are positive integers. The chip rate of the noiseless local replica compressed PRN code is times the chip rate of the noiseless local replica original PRN code when d=1.

Process 1300 performs a sample-to-sample multiplication operation on the noisy received original PRN code and the noiseless local replica compressed PRN code to generate a noisy received composite PRN code (operation 1308).

The received wireless transmission is tracked according to the noisy received composite PRN code (operation 1310). Process 1300 then ends.

Figure 14:
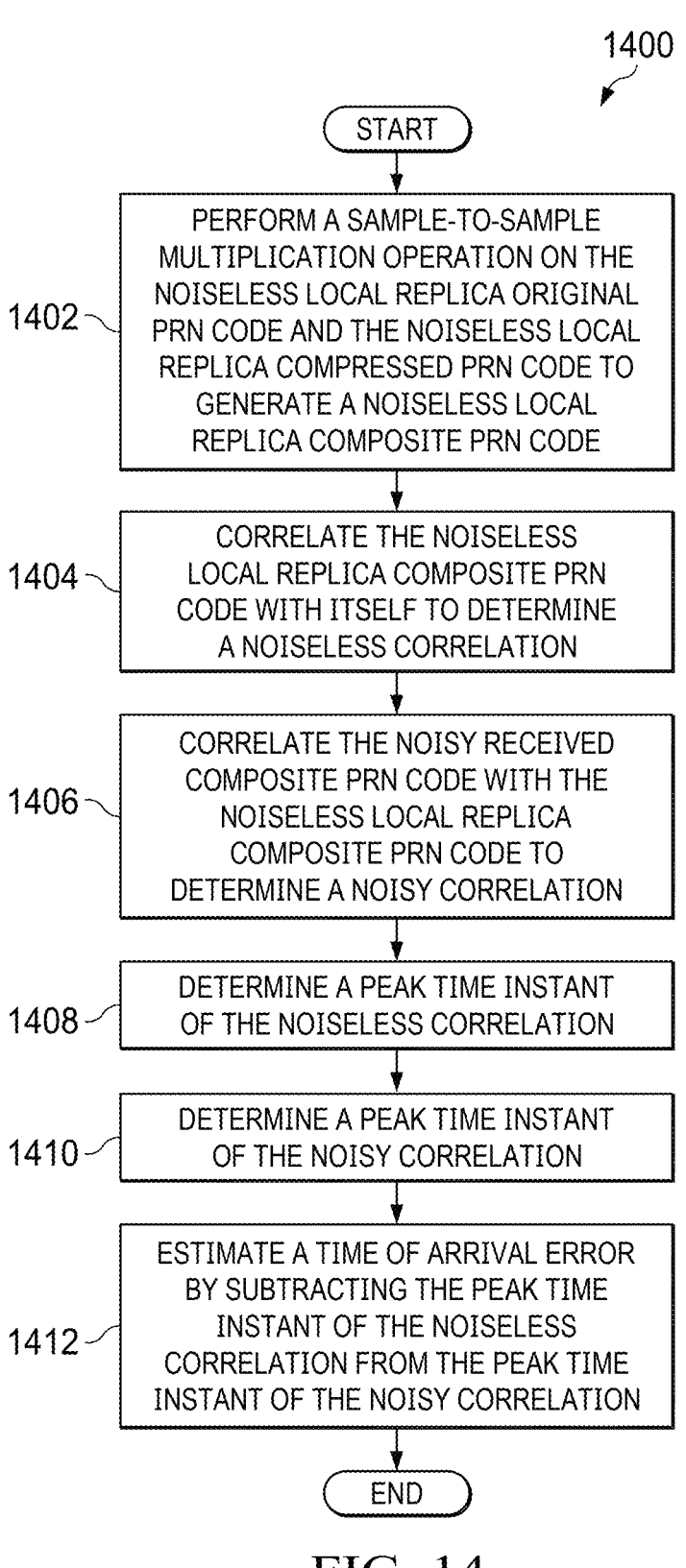
FIG. 14 depicts a flowchart illustrating a process for tracking a transmission according to a composite PRN code in accordance with an illustrative embodiment.

FIG. 14 depicts a flowchart illustrating a process for tracking a transmission according to a composite PRN code in accordance with an illustrative embodiment. Process 1400 is a detailed example of operation 1310 in FIG. 13.

Process 1400 begins by performing a sample-to-sample multiplication operation on the noiseless local replica original PRN code and the noiseless local replica compressed PRN code to generate a noiseless local replica composite PRN code (operation 1402).

Process 1400 correlates the noiseless local replica composite PRN code with itself to determine a noiseless correlation (operation 1404) and correlates the noisy received composite PRN code with the noiseless local replica composite PRN code to determine a noisy correlation (operation 1406).

Process 1400 determines a peak time instant of the noiseless correlation (operation 1408) and determines a peak time instant of the noisy correlation (operation 1410).

A time of arrival error is then estimated by subtracting the peak time instant of the noiseless correlation from the peak time instant of the noisy correlation (operation 1412). Process 1400 then ends.

Figure 15:
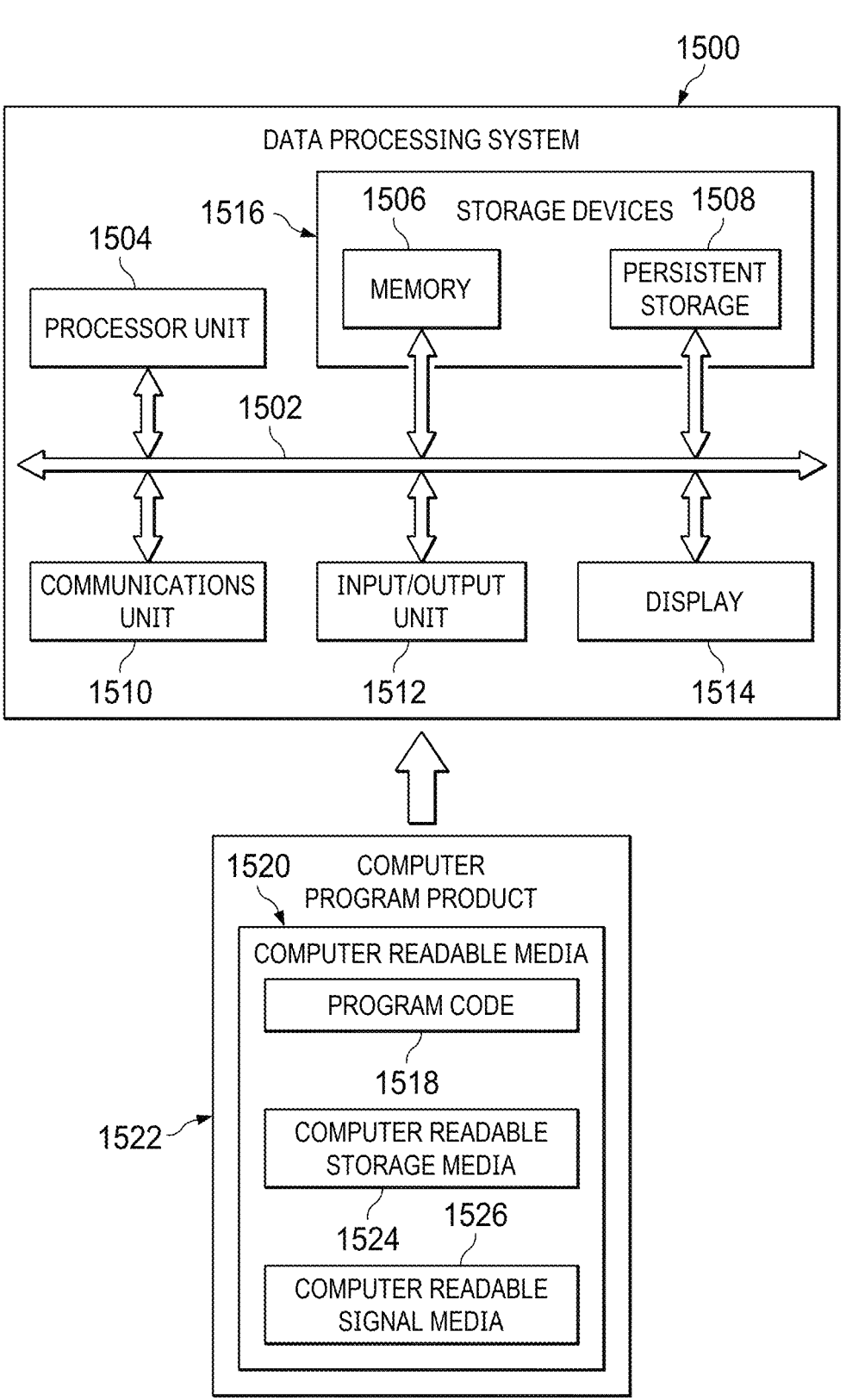
FIG. 15 is an illustration of a block diagram of a data processing system in accordance with an illustrative embodiment.

Turning now to FIG. 15, an illustration of a block diagram of a data processing system is depicted in accordance with an illustrative embodiment. Data processing system 1500 may be used to implement computer system 150 in FIG. 1. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 takes the form of a bus system.

Processor unit 1504 serves to execute instructions for software that may be loaded into memory 1506. Processor unit 1504 may be a number of processors, a multi-processor core, or some other type of processor, depending on the particular implementation. In an embodiment, processor unit 1504 comprises one or more conventional general-purpose central processing units (CPUs). In an alternate embodiment, processor unit 1504 comprises one or more graphical processing units (GPUs).

Memory 1506 and persistent storage 1508 are examples of storage devices 1516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1516 may also be referred to as computer-readable storage devices in these illustrative examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508. Communications unit 1510, in these illustrative examples, provides for communications with other data processing systems or devices. In these illustrative examples, communications unit 1510 is a network interface card.

Input/output unit 1512 allows for input and output of data with other devices that may be connected to data processing system 1500. For example, input/output unit 1512 may provide a connection for user input through at least one of a keyboard, a mouse, or some other suitable input device. Further, input/output unit 1512 may send output to a printer. Display 1514 provides a mechanism to display information to a user.

Instructions for at least one of the operating system, applications, or programs may be located in storage devices 1516, which are in communication with processor unit 1504 through communications framework 1502. The processes of the different embodiments may be performed by processor unit 1504 using computer-implemented instructions, which may be located in a memory, such as memory 1506.

These instructions are referred to as program code, computer-usable program code, or computer-readable program code that may be read and executed by a processor in processor unit 1504. The program code in the different embodiments may be embodied on different physical or computer-readable storage media, such as memory 1506 or persistent storage 1508.

Program code 1518 is located in a functional form on computer-readable media 1520 that is selectively removable and may be loaded onto or transferred to data processing system 1500 for execution by processor unit 1504. Program code 1518 and computer-readable media 1520 form computer program product 1522 in these illustrative examples. In one example, computer-readable media 1520 may be computer-readable storage media 1524 or computer-readable signal media 1526.

In these illustrative examples, computer-readable storage media 1524 is a physical or tangible storage device used to store program code 1518 rather than a medium that propagates or transmits program code 1518. Computer readable storage media 1524, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1518 may be transferred to data processing system 1500 using computer-readable signal media 1526. Computer-readable signal media 1526 may be, for example, a propagated data signal containing program code 1518. For example, computer-readable signal media 1526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code 1518.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of generating a composite pseudo random noise (PRN) code, the method comprising:

receiving, by a PRN receiver, a wireless transmission having a noisy received original PRN code multiplexed with navigation data;

generating a noiseless local replica original PRN code within the PRN receiver;

generating, using the noiseless local replica original PRN code, a noiseless local replica compressed PRN code, wherein the noiseless local replica compressed PRN code comprises a same length as the noiseless local replica original PRN code, and wherein the noiseless local replica compressed PRN code comprises a higher chip rate than the noiseless local replica original PRN code;

performing a sample-to-sample multiplication operation on the noisy received original PRN code and the noiseless local replica compressed PRN code to generate a noisy received composite PRN code;

correlating a noiseless local replica composite PRN code with itself to determine a noiseless correlation;

correlating the noisy received composite PRN code with the noiseless local replica composite PRN code to determine a noisy correlation; and tracking a received wireless transmission according to the noisy received composite PRN code.

2. The method of claim 1, wherein the noiseless local replica compressed PRN code is generated by taking d samples from the noiseless local replica original PRN code out of every n consecutive samples, wherein d<n, and wherein d and n are positive integers.

3. The method of claim 2, wherein the chip rate of the noiseless local replica compressed PRN code is n times the chip rate of the noiseless local replica original PRN code when d=1.

4. The method of claim 1, further comprising the PRN receiver comprising a sampling module generating the noiseless local replica compressed PRN code.

5. The method of claim 1, further comprising the PRN receiver comprising a composite module generating the noisy received composite PRN code.

6. The method of claim 5, further comprising:

determining a peak time instant of the noiseless correlation; and determining a peak time instant of the noisy correlation.

7. The method of claim 6, further comprising estimating a time of arrival error by subtracting the peak time instant of the noiseless correlation from the peak time instant of the noisy correlation.

8. A system configured to generate a composite pseudo random noise (PRN) code, wherein the system comprises:

a storage device that stores program instructions;

one or more processors operably connected to the storage device and configured to execute the program instructions to cause the system to:

receive, by a PRN receiver, a wireless transmission having a noisy received original PRN code multiplexed with navigation data;

generate a noiseless local replica original PRN code within the PRN receiver;

generate a noiseless local replica compressed PRN code based on the noiseless local replica original PRN code, wherein the noiseless local replica compressed PRN code has a same length as the noiseless local replica original PRN code, and wherein the noiseless local replica compressed PRN code has a higher chip rate than the noiseless local replica original PRN code;

perform a sample-to-sample multiplication operation on the noisy received original PRN code and the noiseless local replica compressed PRN code to generate a noisy received composite PRN code;

perform a sample-to-sample multiplication operation on the noiseless local replica original PRN code and the noiseless local replica compressed PRN code to generate a noiseless local replica composite PRN code;

correlate the noiseless local replica composite PRN code with itself to determine a noiseless correlation;

correlate the noisy received composite PRN code with the noiseless local replica composite PRN code to determine a noisy correlation; and track a received wireless transmission according to the noisy received composite PRN code.

9. The system of claim 8, wherein the noiseless local replica compressed PRN code is generated by taking d samples from the noiseless local replica original PRN code out of every n consecutive samples, wherein d<n, and wherein d and n are positive integers.

10. The system of claim 9, wherein the chip rate of the noiseless local replica compressed PRN code is n times the chip rate of the noiseless local replica original PRN code when d=1.

11. The system of claim 8, wherein the PRN receiver comprises a sampling module configured to generate the noiseless local replica composite PRN code.

12. The system of claim 8, wherein the PRN receiver comprises a composite module configured to generate the noisy received composite PRN.

13. The system of claim 12, wherein the processors further execute instructions to:

determine a peak time instant of the noiseless correlation; and determine a peak time instant of the noisy correlation.

14. The system of claim 13, wherein the processors further execute instructions to estimate a time of arrival error by subtracting the peak time instant of the noiseless correlation from the peak time instant of the noisy correlation.

15. A non-transitory computer program product configured to generate a composite pseudo random noise (PRN) code, wherein the non-transitory computer program product comprises a computer-readable storage medium that comprises program instructions embodied thereon configured to perform operations of:

receiving, by a PRN receiver, a wireless transmission having a noisy received original PRN code multiplexed with navigation data;

generating a noiseless local replica original PRN code within the PRN receiver;

generating a noiseless local replica compressed PRN code based on the noiseless local replica original PRN code, wherein the noiseless local replica compressed PRN code has a same length as the noiseless local replica original PRN code, and wherein the noiseless local replica compressed PRN code has a higher chip rate than the noiseless local replica original PRN code;

performing a sample-to-sample multiplication operation on the noisy received original PRN code and the noiseless local replica compressed PRN code to generate a noisy received composite PRN code;

performing a sample-to-sample multiplication operation on the noisy received original PRN code and the noiseless local replica compressed PRN code to generate a noisy received composite PRN code;

correlating a noiseless local replica composite PRN code with itself to determine a noiseless correlation;

correlating the noisy received composite PRN code with the noiseless local replica composite PRN code to determine a noisy correlation; and tracking a received wireless transmission according to the noisy received composite PRN code.

16. The non-transitory computer program product of claim 15, wherein the noiseless local replica compressed PRN code is generated by taking d samples from the noiseless local replica original PRN code out of every n consecutive samples, wherein d<n, and wherein d and n are positive integers.

17. The non-transitory computer program product of claim 15, wherein the PRN receiver comprises a sampling module configured to generate the noiseless local replica compressed PRN code.

18. The non-transitory computer program product of claim 15, wherein the PRN receiver comprises a sampling module configured to generate the noisy received composite PRN code.

19. The non-transitory computer program product of claim 18, further comprising instructions for:

determining a peak time instant of the noiseless correlation; and determining a peak time instant of the noisy correlation.

20. The non-transitory computer program product of claim 19, further comprising instructions for estimating a time of arrival error by subtracting the peak time instant of the noiseless correlation from the peak time instant of the noisy correlation.

\* \* \* \* \*